(12) United States Patent
Ishikawa

(10) Patent No.: US 12,358,097 B2
(45) Date of Patent: Jul. 15, 2025

(54) POWER TOOL

(71) Applicant: MAKITA CORPORATION, Anjo (JP)

(72) Inventor: Junya Ishikawa, Anjo (JP)

(73) Assignee: MAKITA CORPORATION, Anjo (JP)

( * ) Notice: Subject to any disclaimer, the term of this patent is extended or adjusted under 35 U.S.C. 154(b) by 257 days.

(21) Appl. No.: 17/944,724

(22) Filed: Sep. 14, 2022

(65) Prior Publication Data

US 2023/0107123 A1 Apr. 6, 2023

(30) Foreign Application Priority Data

Oct. 5, 2021 (JP) .................................. 2021-164259

(51) Int. Cl.
*B24B 47/12* (2006.01)
*B25F 5/02* (2006.01)
*H02K 5/10* (2006.01)
*H02K 11/30* (2016.01)

(52) U.S. Cl.
CPC ................ *B24B 47/12* (2013.01); *B25F 5/02* (2013.01); *H02K 5/10* (2013.01); *H02K 11/30* (2016.01)

(58) Field of Classification Search
CPC ........ H02K 11/28; H02K 7/145; H02K 11/30; H02K 11/33; H02K 5/10; H02K 2211/03; B24B 47/12; B25F 5/02
USPC ......................................................... 310/266
See application file for complete search history.

(56) References Cited

U.S. PATENT DOCUMENTS

| | | |
|---|---|---|
| 6,540,545 B1 | 4/2003 | Itakura et al. |
| 2007/0079980 A1 | 4/2007 | Kononenko et al. |
| 2011/0272264 A1 | 11/2011 | Sengiku et al. |
| 2015/0263592 A1* | 9/2015 | Kawakami ............. B25F 5/008 451/359 |
| 2017/0110935 A1* | 4/2017 | Oktavec ................ B24B 23/028 |

(Continued)

FOREIGN PATENT DOCUMENTS

| | | |
|---|---|---|
| JP | 2001-105354 A | 4/2001 |
| JP | 2011-235376 A | 11/2011 |

(Continued)

OTHER PUBLICATIONS

Mar. 11, 2025 Office Action issued in Japenese Patent Application No. 2021-164259.

*Primary Examiner* — Alex W Mok
(74) *Attorney, Agent, or Firm* — Oliff PLC

(57) ABSTRACT

A power tool has highly airtight electrical connection between a controller and a switch to effectively prevent a short circuit. A grinder includes a housing, a motor accommodated in the housing, a controller accommodated in the housing and including a circuit board and a controller terminal located on a first facing surface and electrically connected to the circuit board, a switch accommodated in the housing and including a switch terminal located on a second facing surface facing the controller, being in direct contact with the controller terminal, and electrically connected to the controller terminal, and a seal located between the first facing surface and the second facing surface and sealing a periphery of the controller terminal and a periphery of the switch terminal with the controller terminal being in direct contact with the switch terminal. The first facing surface is a surface of the controller facing the switch.

16 Claims, 12 Drawing Sheets

(56) References Cited

U.S. PATENT DOCUMENTS

2018/0117728 A1    5/2018  Kawakami et al.
2018/0337575 A1*  11/2018  Sengiku ............... H01R 13/516
2019/0375089 A1   12/2019  Boeck et al.
2020/0147777 A1*   5/2020  Aoki ....................... B25F 5/006
2021/0268637 A1*   9/2021  Goto ..................... B24B 23/028

FOREIGN PATENT DOCUMENTS

JP         5468459 B2    4/2014
JP       2018-075703 A   5/2018

* cited by examiner

POWER TOOL

CROSS-REFERENCE TO RELATED APPLICATIONS

This application claims the benefit of priority to Japanese Patent Application No. 2021-164259, filed on Oct. 5, 2021, the entire contents of which are hereby incorporated by reference.

BACKGROUND

1. Technical Field

The present disclosure relates to a power tool such as a grinder.

2. Description of the Background

In power tools such as grinders, as described in Japanese Patent No. 5468459 (hereafter, Patent Literature 1), a controller and a switch that turns on or off a motor are accommodated in a housing, and the controller and the switch are electrically connected to each other. One known grinder described in Patent Literature 1 includes a switch block including a switch attached to a housing. A male terminal protrudes from the controller, and a female terminal is accommodated in the switch block to form a connecting portion including an inlet for the male terminal. When the switch block is attached to the controller, the male terminal is placed into and connected to the female terminal. A sealing portion above the male terminal covers the surface of the connecting portion with the inlet, with the male terminal being placed and connected. The connecting portion thus achieves dust resistance.

BRIEF SUMMARY

A known power tool has a sealing portion formed from a resin. The surface with the inlet for the male terminal covered with such a sealing portion cannot have high airtightness and may cause entry of iron powder or other matter that can cause a short circuit.

One or more aspects of the present disclosure are directed to a power tool that has highly airtight electrical connection between a controller and a switch to effectively prevent a short circuit.

An aspect of the present disclosure provides a power tool, including:
- a housing;
- a motor accommodated in the housing;
- a controller accommodated in the housing, the controller including
  - a circuit board, and
  - a controller terminal located on a first facing surface and electrically connected to the circuit board;
- a switch accommodated in the housing, the switch including a switch terminal located on a second facing surface facing the controller, the switch terminal being in direct contact with the controller terminal and electrically connected to the controller terminal; and
- a seal between the first facing surface and the second facing surface, the seal sealing a periphery of the controller terminal and a periphery of the switch terminal with the controller terminal being in direct contact with the switch terminal, wherein the first facing surface is a surface of the controller facing the switch.

The power tool according to the above aspect of the present disclosure has highly airtight electrical connection between the controller and the switch to effectively prevent a short circuit.

DETAILED DESCRIPTION

Embodiments of the present disclosure will now be described with reference to the drawings.

Figure 1:
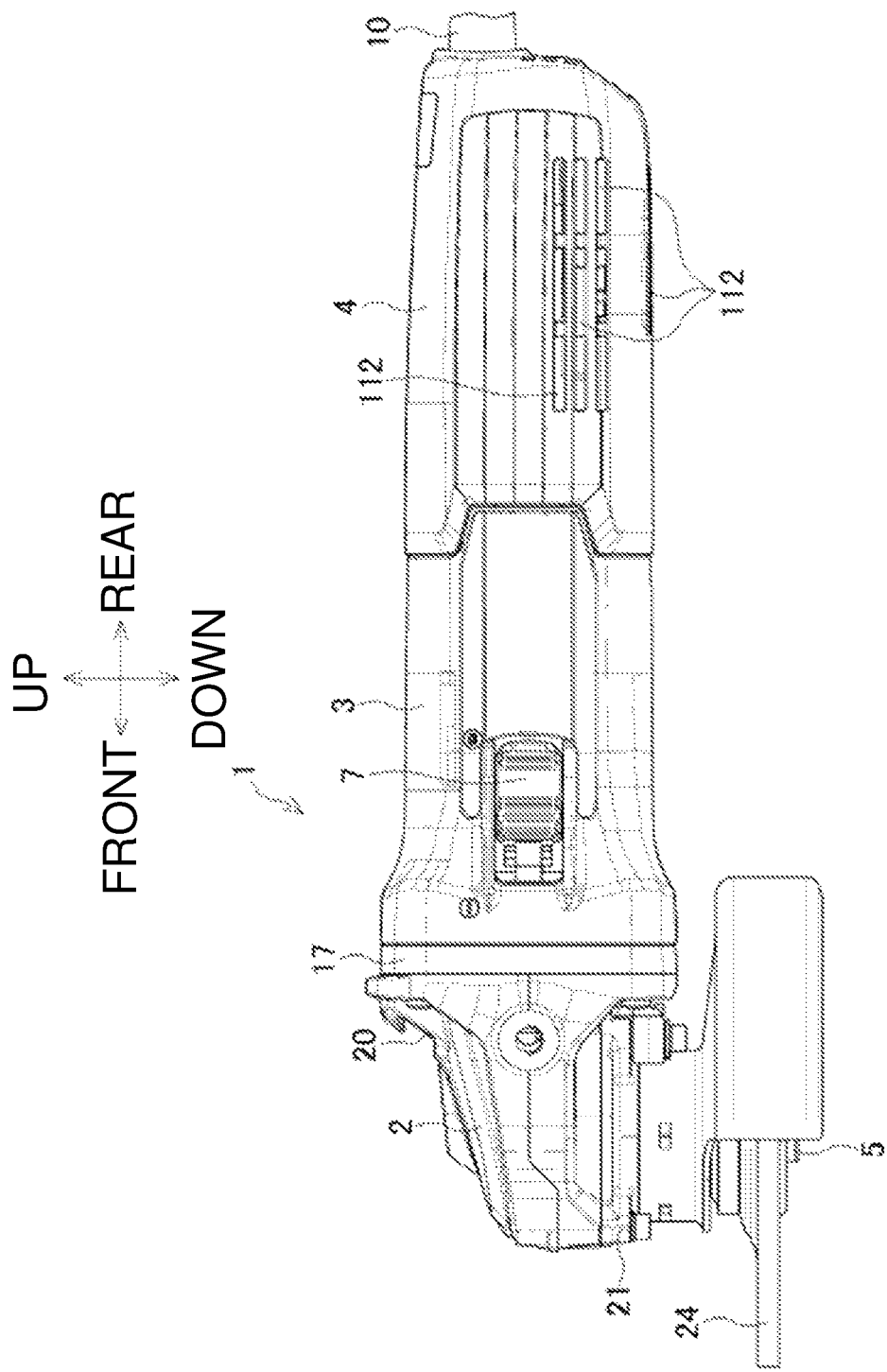
FIG. 1 is a side view of a grinder.
Figure 2:
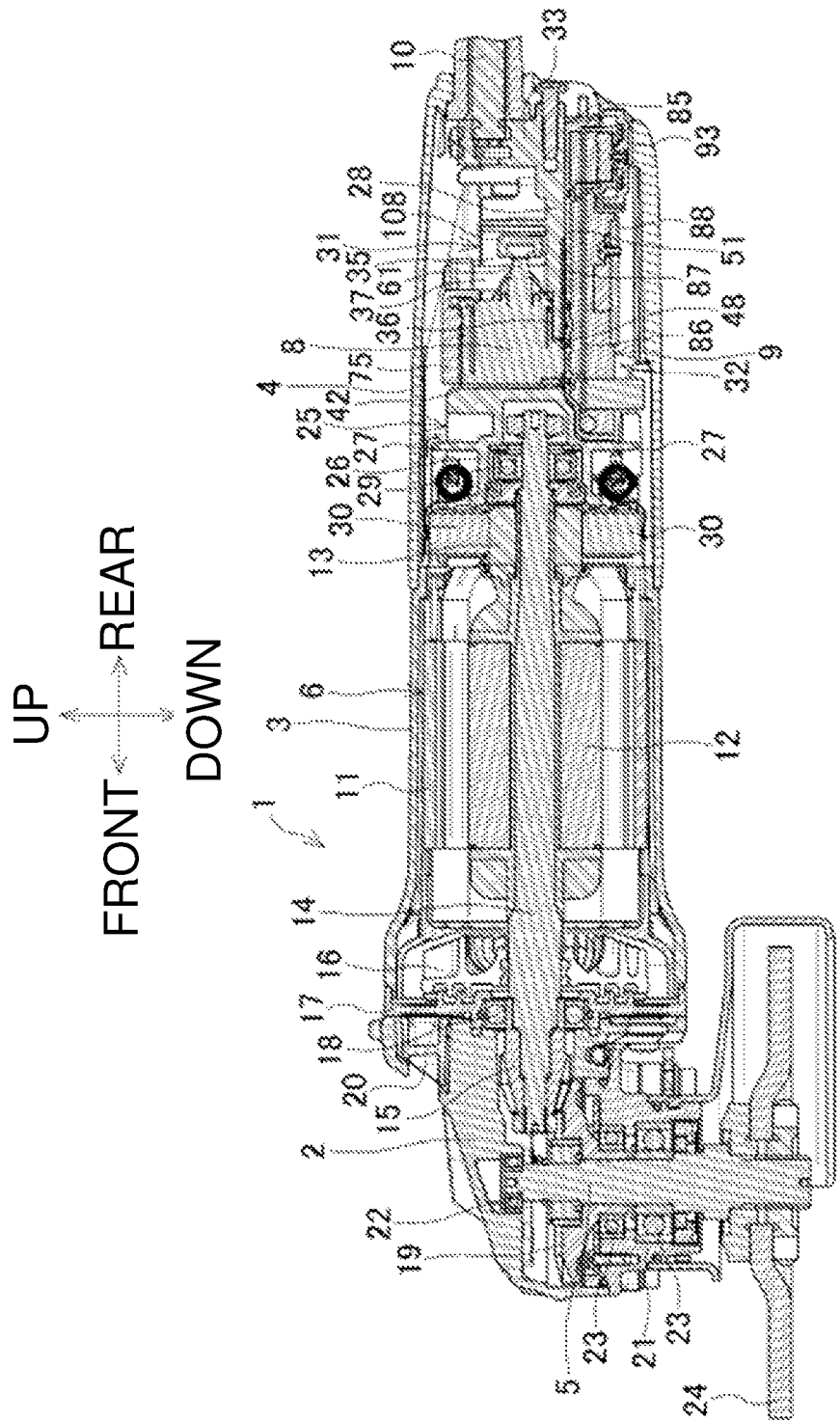
FIG. 2 is a longitudinal central sectional view of the grinder.
Figure 3:
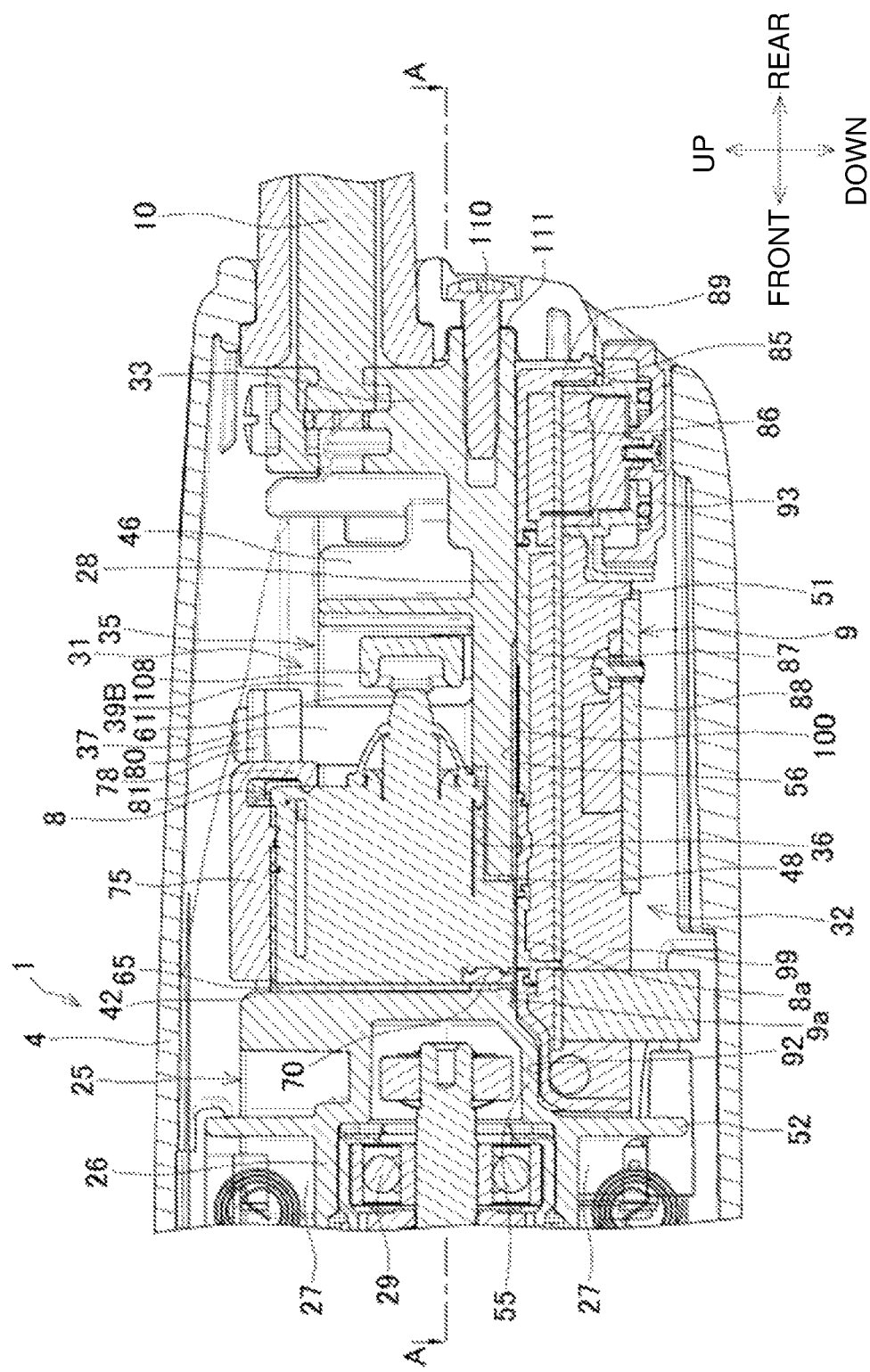
FIG. 3 is an enlarged view of a rear cover in FIG. 2.

FIG. 1 is a side view of a grinder as an example of a power tool. FIG. 2 is a longitudinal central sectional view of the grinder. FIG. 3 is an enlarged view of the rear of FIG. 2.

A grinder 1 includes a housing including a gear housing 2, a motor housing 3, and a rear cover 4 in this order from the front. The gear housing 2 is formed from a metal. The motor housing 3 and the rear cover 4 are formed from a resin. A spindle 5 protrudes downward from the gear housing 2.

The motor housing 3 is cylindrical and extends in the front-rear direction. The motor housing 3 accommodates a motor 6. The motor housing 3 holds, on its left side surface, a switch knob 7 in a slidable manner. The rear cover 4 is cylindrical and extends in the front-rear direction. The rear cover 4 accommodates a switch 8 and a controller 9. The rear cover 4 is connected to a power cable 10 on its rear.

The motor 6 is a commutator motor including a stator 11, a rotor 12, and a commutator 13. An output shaft 14 included in the rotor 12 extends frontward and has its distal end protruding into the gear housing 2. The output shaft 14 receives a bevel gear 15 at the distal end. The output shaft 14 receives a fan 16 in a front portion of the motor housing 3.

A partition 17 is located between the gear housing 2 and the motor housing 3. An output shaft 14 extends through the partition 17. The partition 17 receives a bearing 18 that supports the output shaft 14.

A bevel gear 19 is mounted on an upper portion of the spindle 5 inside the gear housing 2. The bevel gear 19 meshes with the bevel gear 15 on the output shaft 14. The gear housing 2 has multiple outlets 20 in the front surface.

The gear housing 2 receives a bearing box 21 attached to its lower portion. The spindle 5 is supported by a bearing 22 and two bearings 23. The bearing 22 is held in the gear housing 2. The two bearings 23 are held in the bearing box 21. The spindle 5 protrudes from the bearing box 21. The spindle 5 has a lower end to receive a tip tool 24, such as a grinding disc.

Figure 4:
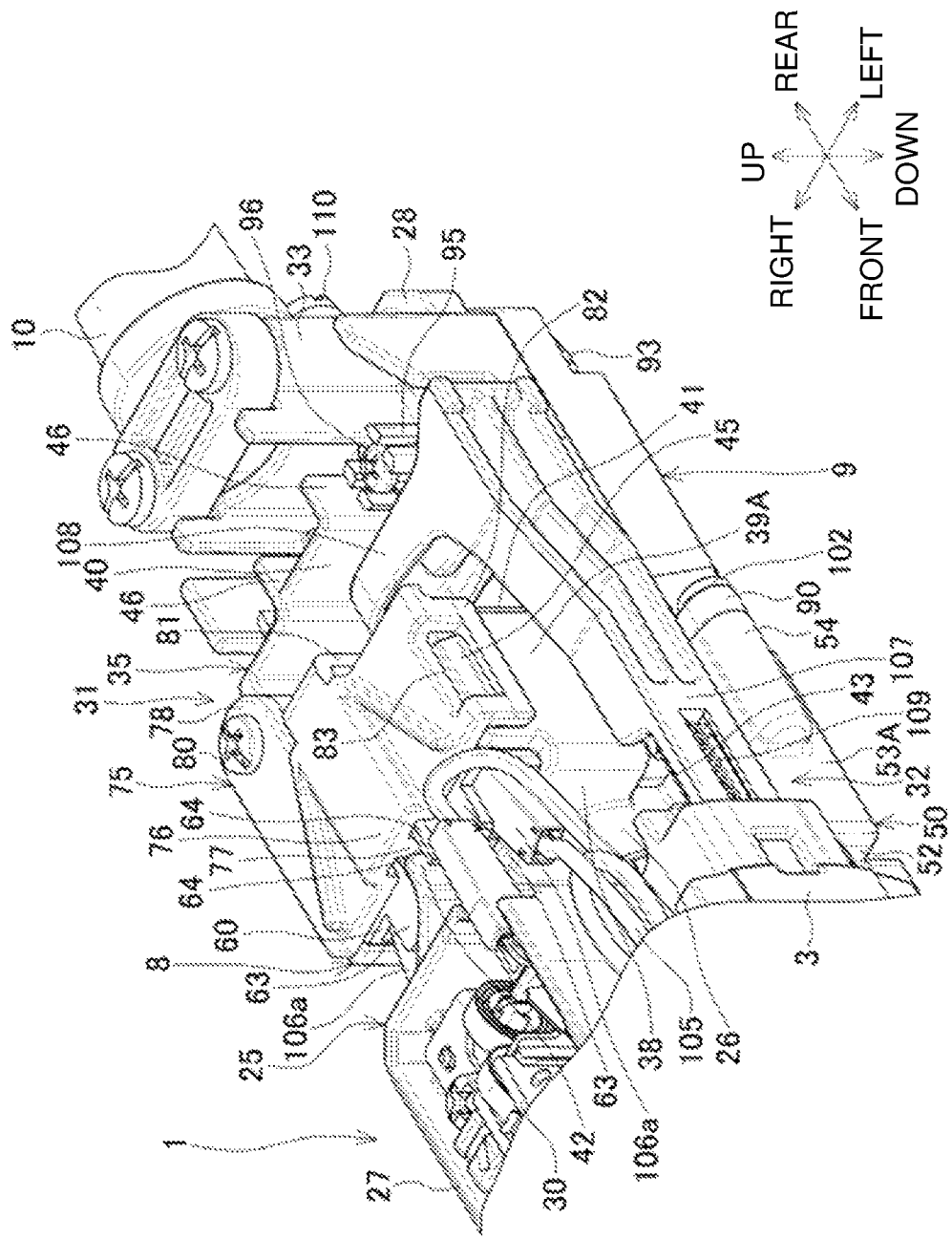
FIG. 4 is a perspective view of a rear portion of the grinder without showing the rear cover.
Figure 5:
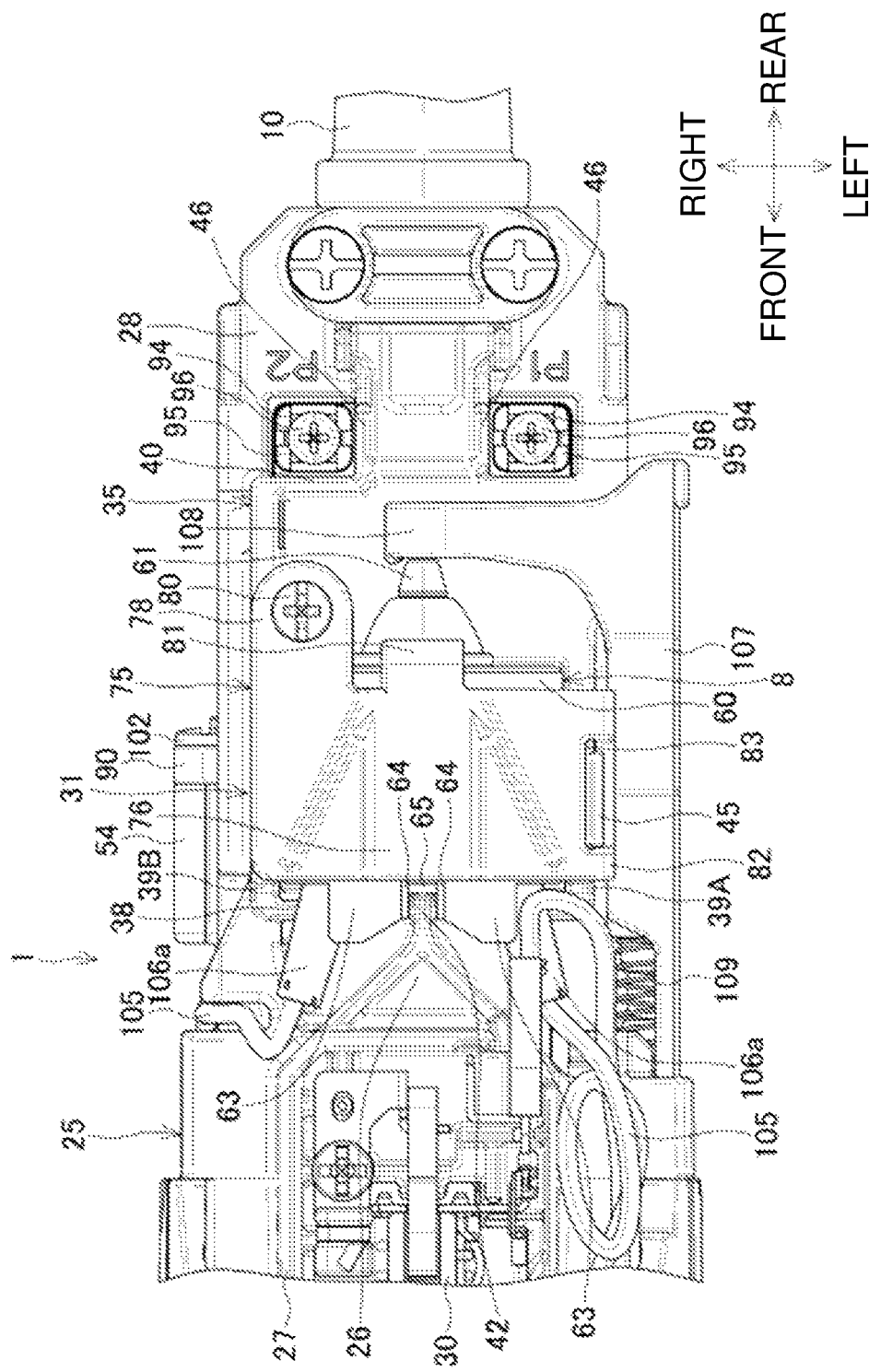
FIG. 5 is a plan view of the rear portion of the grinder without showing the rear cover.
Figure 6:
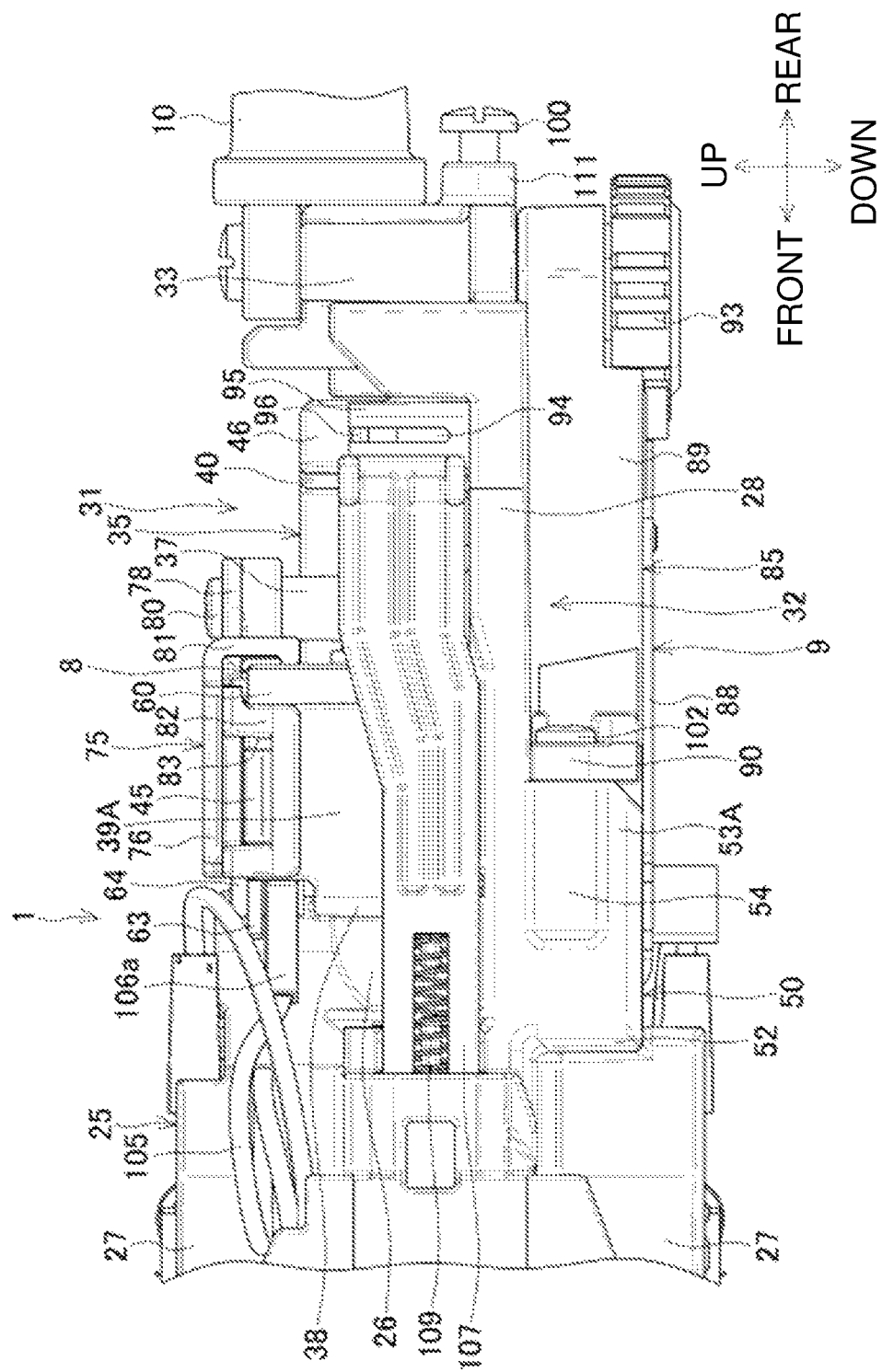
FIG. 6 is a side view of the rear portion of the grinder without showing the rear cover.

An inner housing 25 is integral with the rear end of the motor housing 3. The inner housing 25 extends rearward in the rear cover 4. The inner housing 25 includes a front bearing holder 26, a pair of brush holders 27, and a mount plate 28, as also shown in FIGS. 4 to 6. The pair of brush holders 27 are located above and below the bearing holder 26.

The bearing holder 26 is cylindrical and has its axis in the front-rear direction. The bearing holder 26 holds a bearing 29 that supports the rear end of the output shaft 14. The brush holder 27 is a rectangular frame as viewed in plan with openings at the top and the bottom. The brush holder 27 holds brushes 30 in contact with the commutator 13.

The mount plate 28 extends rearward from the bearing holder 26 and the brush holder 27. The mount plate 28 is parallel to the plane defined by the front-rear and lateral directions. The mount plate 28 includes a switch holder 31 and a controller holder 32. The switch holder 31 is located above the mount plate 28 and holds the switch 8. The controller holder 32 is located below the mount plate 28 and holds the controller 9. A cable receiver 33 is located behind the switch holder 31 and on the upper surface of the mount plate 28. The cable receiver 33 clamps the power cable 10.

The switch holder 31 includes an upper retainer wall 35, an upper attachment seat 36, and an upper screw boss 37.

Figure 7:
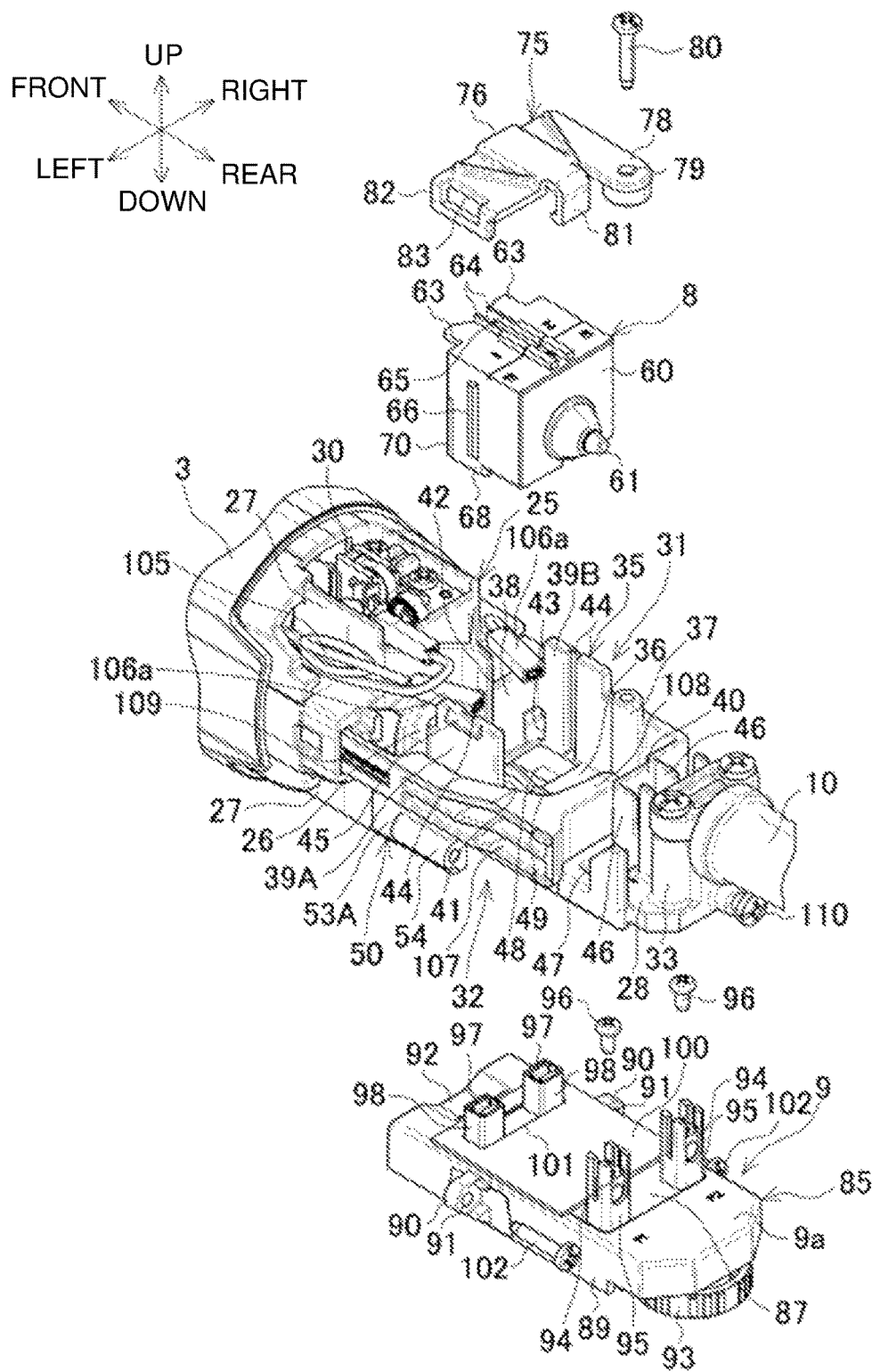
FIG. 7 is an exploded perspective view of an inner housing, a controller, and a switch as viewed from above.

As also shown in FIG. 7, the upper retainer wall 35 is a rectangular wall as viewed in plan and extends vertically on the upper surface of the mount plate 28 and is open toward the top. The upper retainer wall 35 includes an upper front wall 38, left and right upper side walls 39A and 39B, and an upper rear wall 40. The left upper side wall 39A is located on the front alone. The upper side wall 39A has a cutout 41 at its rear to open the left side of the upper retainer wall 35. A front rib 42 extending in the vertical direction is located at the middle of the upper front wall 38 in the lateral direction. The front rib 42 extends vertically between the upper surface of the bearing holder 26 and the rear surface of the upper brush holder 27. Vents 43 extends in the front-rear direction through lower portions of the joints between the upper front wall 38 and the left side wall 39A and between the upper front wall 38 and the right upper side wall 39B.

The front portions of the left and right upper side walls 39A and 39B are higher than the upper front wall 38 and the upper rear wall 40. The upper side walls 39A and 39B have a pair of rectangular grooves 44 on their opposing inner surfaces. Each rectangular groove 44 extends vertically. A locking tab 45 extends in the front-rear direction on the outer surface of the left upper side wall 39A. A pair of left and right partition ribs 46 extends vertically on the rear surface of the upper rear wall 40. The mount plate 28 has a pair of holes 47 on the left and right of the partition ribs 46.

The mount plate 28 has a through-hole 48 between the left upper side wall 39A and the right upper side wall 39B. The through-hole 48 is rectangular and elongated laterally as viewed in plan.

The upper attachment seat 36 is located at the rear of the through-hole 48 between the left upper side wall 39A and the right upper side wall 39B. The upper attachment seat 36 is located lower than the rear upper surface of the mount plate 28 and extends laterally. A bottom rib 49 extends in the front-rear direction at the middle of the upper attachment seat 36 in the lateral direction.

The upper screw boss 37 is located behind and rightward from the upper attachment seat 36 and extends upward on the mount plate 28.

Figure 8:
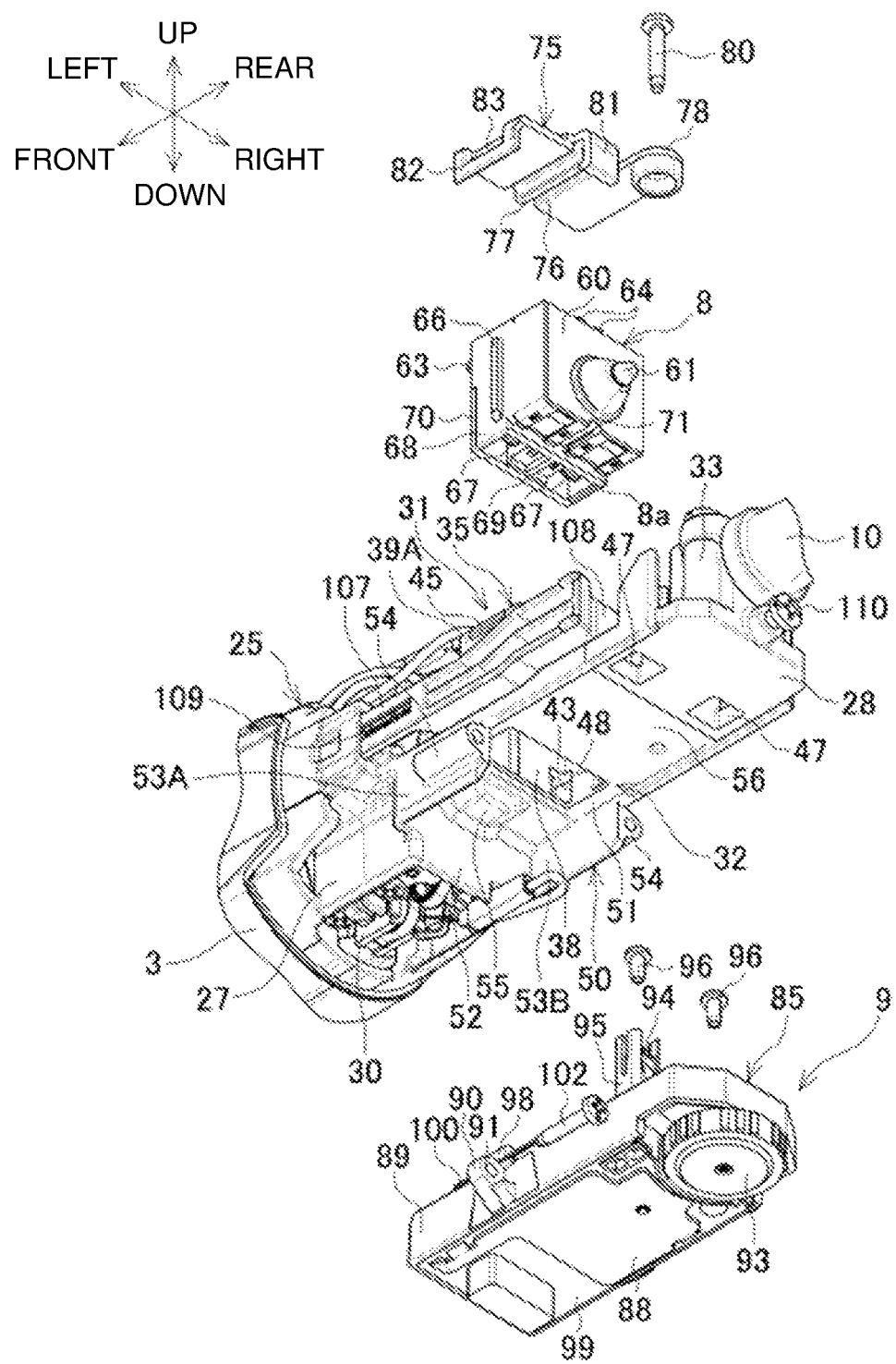
FIG. 8 is an exploded perspective view of the inner housing, the controller, and the switch as viewed from below.
Figure 9B:
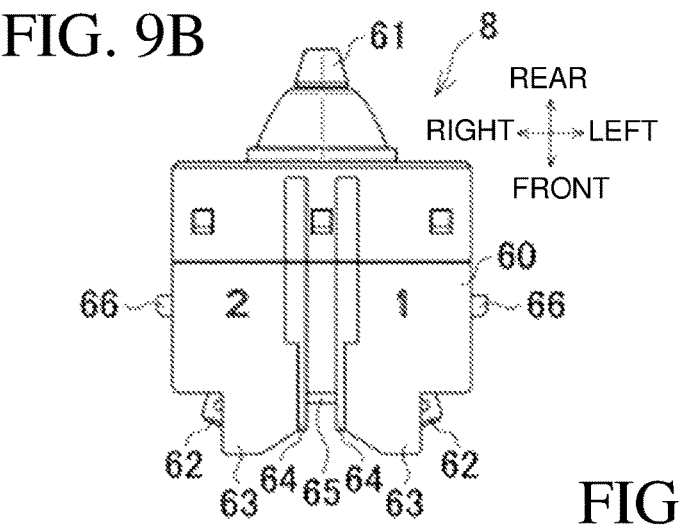
FIG. 9B is a plan view of the switch.
Figure 9A:
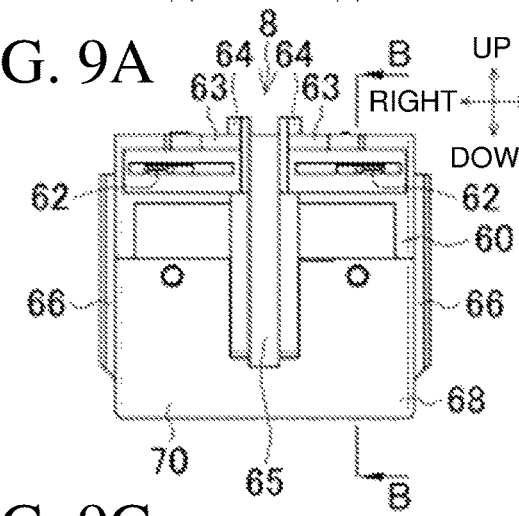
FIG. 9A is a front view of a switch.
Figure 9D:
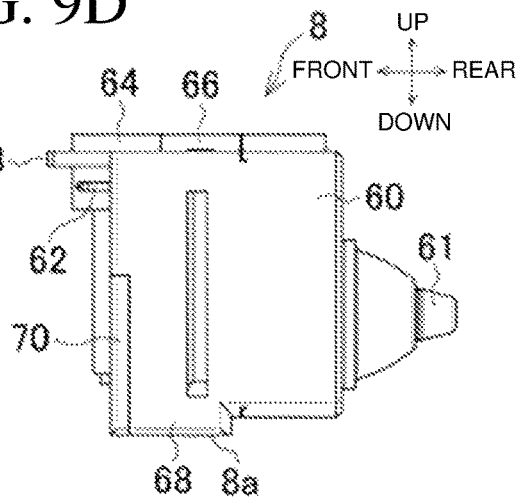
FIG. 9D is a side view of the switch.
Figure 9C:
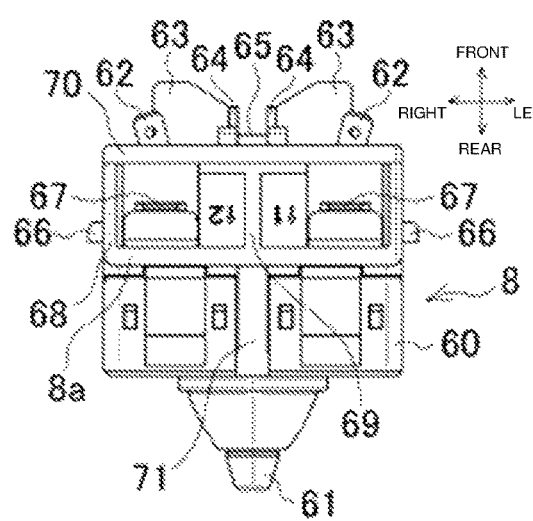
FIG. 9C is a bottom view of the switch.
Figure 9E:
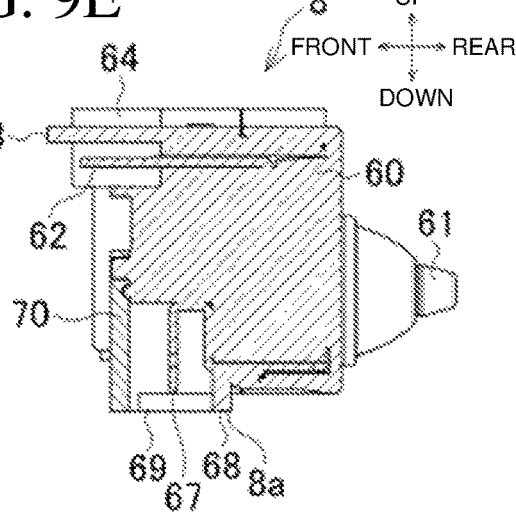
FIG. 9E is a cross-sectional view taken along line B-B in FIG. 9A.

The controller holder 32 includes a lower retainer wall 50 and a lower attachment seat 51, as also shown in FIG. 8. The lower retainer wall 50 extends downward from a front portion of the mount plate 28. The lower retainer wall 50 extends downward from the left and right side surfaces of the mount plate 28 and surrounds the lower front surface of the mount plate 28.

The lower retainer wall 50 includes a lower front wall 52 and left and right lower side walls 53A and 53B. The lower front wall 52 is integral with the lower brush holder 27. The left and right lower side walls 53A and 53B include front portions continuous with the lower front wall 52 and extending downward farther than rear portions. The left and right lower side walls 53A and 53B receive a pair of lower screw bosses 54 on their outer front surfaces. Each lower screw boss 54 extends rearward.

The lower attachment seat 51 is located on the full lower surface of the mount plate 28, including the area surrounded by the lower retainer wall 50. A protrusion 55 extends downward in a front portion of and at the middle of the lower attachment seat 51 in the lateral direction. The protrusion 55 is located frontward from the through-hole 48. A recess 56 is recessed upward on the lower surface of the mount plate 28 between the protrusion 55 and the hole 47. The through-hole 48 is located in the recess 56.

The switch 8 is a push switch that is turned on in response to a pressing operation on a button 61 protruding from the housing 60. The housing 60 has a rectangular shape fitting between the left and right upper side walls 39A and 39B of the switch holder 31. The button 61 is located on the rear surface of the housing 60 facing rearward. As also shown in FIGS. 9A to 9E, the housing 60 includes a pair of positive and negative output terminals 62 on the left and right of its upper front surface. Each output terminal 62 is a plate extending frontward. A pair of left and right protection plates 63 is located on the upper plate of the housing 60. Each protection plate 63 covers the output terminal 62 from above, excluding the distal end of the corresponding output terminal 62. Each protection plate 63 protrudes frontward.

A pair of left and right ridges 64 is located between the left and right protection plates 63. Each ridge 64 extends across the upper surface and the front surface of the housing 60. The pair of left and right ridges 64 are apart from each other laterally at a predetermined interval. A sealing member (a sponge in this example) 65 is bonded to the front surface of the housing 60 between the ridges 64. The sealing member 65 is a strip plate extending vertically. The sealing member 65 is aligned with the front rib 42 on the upper front wall 38 of the upper retainer wall 35. A pair of side ribs 66 extending vertically is located on the left and right side surfaces of the housing 60. The side ribs 66 are aligned with the rectangular grooves 44 on the left and right upper side walls 39A and 39B of the upper retainer wall 35.

A pair of positive and negative switch terminals 67 is located on the left and right of the front portion of the housing 60. Each switch terminal 67 is a plate extending downward. On a lower surface 8a of the switch 8A, a rectangular cylinder 68 extends downward in the front portion of the housing 60. The rectangular cylinder 68 surrounds the area including the switch terminal 67 in the lateral and front-rear directions. The rectangular cylinder 68 has a flat lower surface. A divider 69 is located between the left and the right switch terminals 67 in the rectangular cylinder 68. The divider 69 extends downward and divides the inside of the rectangular cylinder 68 into left and right parts. The divider 69 has a lower end flush with the lower surface of the rectangular cylinder 68.

The front plate of the housing 60 includes a lower part corresponding to a front part of the rectangular cylinder 68 as a separate closing plate 70. The closing plate 70 is fixed to the front plate by vibration welding or another method after the switch terminal 67 is attached inside the housing 60. Retrofitting the closing plate 70 in this manner allows the front surface of the housing 60 to be open when the switch terminal 67 is attached. The switch terminal 67 can thus be attached easily.

At the rear of the rectangular cylinder 68, the rear lower surface of the housing 60 is stepped and raised from the lower end of the rectangular cylinder 68. A lower groove 71 extends in the front-rear direction at the middle of the rear lower surface of the housing 60 in the lateral direction. The lower groove 71 is aligned with the bottom rib 49 on the upper attachment seat 36.

A positioning plate 75 is located above the switch 8. The positioning plate 75 is rectangular in a plan view having a slightly larger length than the lateral width of the housing 60. A fitting recess 76 is located on the lower surface of the positioning plate 75. The fitting recess 76 extends in the front-rear direction and is fitted to the ridge 64 on the upper surface of the housing 60. A fitting rib 77 extends in the front-rear direction inside the fitting recess 76. The fitting rib 77 fits between the pair of ridges 64.

A screw tab 78 extends rearward from the rear right end of the positioning plate 75. The screw tab 78 has a through-hole 79. The through-hole 79 is aligned with the upper screw boss 37. The through-hole 79 can receive a screw 80 for thread engagement.

A rear abutting tab 81 extends downward from the rear end of the positioning plate 75 on the left of the screw tab 78. The lower end of the rear abutting tab 81 can come in contact with the rear surface of the housing 60. A side abutting tab 82 extends downward from the left edge of the positioning plate 75. The side abutting tab 82 can come in contact with the outer surface of the left upper side wall 39A of the upper retainer wall 35. The side abutting tab 82 has an engagement hole 83. The engagement hole 83 is engageable with the locking tab 45 on the upper side wall 39A.

The controller 9 includes a case 85, a circuit board 86, a terminal board 87, and a heat sink 88, as also shown in FIG. 3.

The case 85 has a lateral width fittable between the left and right lower side walls 53A and 53B of the controller holder 32. The case 85 is rectangular in a plan view and extends in the front-rear direction, as also shown in FIGS. 7 and 8. The case 85 is dish-shaped, with a surrounding wall 89 standing downward. Positioning tabs 90 are located on the left and right outer surfaces of the surrounding wall 89. Each positioning tab 90 has a through-hole 91. Each through-hole 91 is aligned with a lower screw boss 54 on the lower side walls 53A and 53B. The case 85 has, on its upper surface, a recess 92 at its front middle. The recess 92 is fitted to the protrusion 55 on the mount plate 28.

The circuit board 86 has a lateral width fittable to the case 85. The circuit board 86 is rectangular in a plan view extending in the front-rear direction. A control unit such as a capacitor and a triac is mounted on the lower surface of the circuit board 86. A variable speed dial 93 for the motor 6 is placed on the lower surface of the rear end of the circuit board 86.

The terminal board 87 is formed from a resin and located above the circuit board 86. A pair of power input terminals 94 is mounted on the rear upper surface of the terminal board 87. The power input terminals 94 are connected to the power cable 10. The power input terminals 94 are held in protective rectangular cylinders 95 and protrude upward. The protective rectangular cylinders 95 are integral with the terminal board 87 and protrude upward. The protective rectangular cylinders 95 can extend through the holes 47 on the rear of the mount plate 28. The power input terminals 94 are electrically connected to the circuit board 86. Screws 96 connecting the power cable 10 are screwed into the upper end of the power input terminals 94.

Controller terminals 97 are located in front of the power input terminals 94 on the terminal board 87. The controller terminals 97 are connected to the switch 8. The controller terminals 97 are insert-molded into front rectangular cylinders 98 formed from a resin. The upper ends of the controller terminals 97 are connected to the switch 8. The upper end of each controller terminal 97 is a female terminal with a pair of front and rear terminal boards. The switch terminal 67 in the switch 8 is placed between the terminal boards of the controller terminals 97 to be in contact with each other. The lower ends of the controller terminals 97 are electrically connected to the circuit board 86. The front rectangular cylinders 98 have a size fittable into the left and right of the rectangular cylinder 68 of the switch 8 from below.

The heat sink 88 is a metal plate covering the circuit board 86 from below, excluding the variable speed dial 93. The heat sink 88 is connected to a triac with screws to be in thermal contact.

The controller 9 is molded with the circuit board 86 receiving the terminal board 87 on the upper surface and the heat sink 88 on the lower surface in the case 85 with a resin 99 filling above the heat sink 88 in the case 85. The power input terminals 94 and the controller terminals 97 protrude upward from an upper surface 9a of the controller 9.

The controller 9 has, on its upper surface 9a, an elastic sheet 100 formed from a sponge. The elastic sheet 100 is rectangular in a plan view covering the upper surface of the case 85 between the power input terminals 94 and the recess 92. The front rectangular cylinders 98 of the controller terminals 97 protrude upward through relief holes 101. The relief hole 101 is elongated laterally and formed in the elastic sheet 100. The relief hole 101 is slightly smaller than the opening of the rectangular cylinder 68.

The elastic sheet 100 is elongated rearward to cover the periphery of the controller terminals 97. This allows the elastic sheet 100 to be located in the reverse direction when the switch 8 is attached in the reverse direction, the switch terminal 67 is shifted to the rear, and the controller terminal 97 is also placed on the rear. The large area of the elastic sheet 100 also enhances the sealing with the mount plate 28.

The assembly of the switch 8 and the controller 9 will now be described.

The recess 92 on the case 85 of the controller 9 is fitted to the protrusion 55 on the mount plate 28 from below, with the heat sink 88 facing downward and the variable speed dial 93 at the rear. The power input terminals 94 are placed from below through the holes 47 in the mount plate 28. The controller terminals 97 are placed from below through the through-hole 48. In an actual assembly, the mount plate 28 is turned upside down, and the controller 9 is attached to the mount plate 28 from above.

Figure 10:
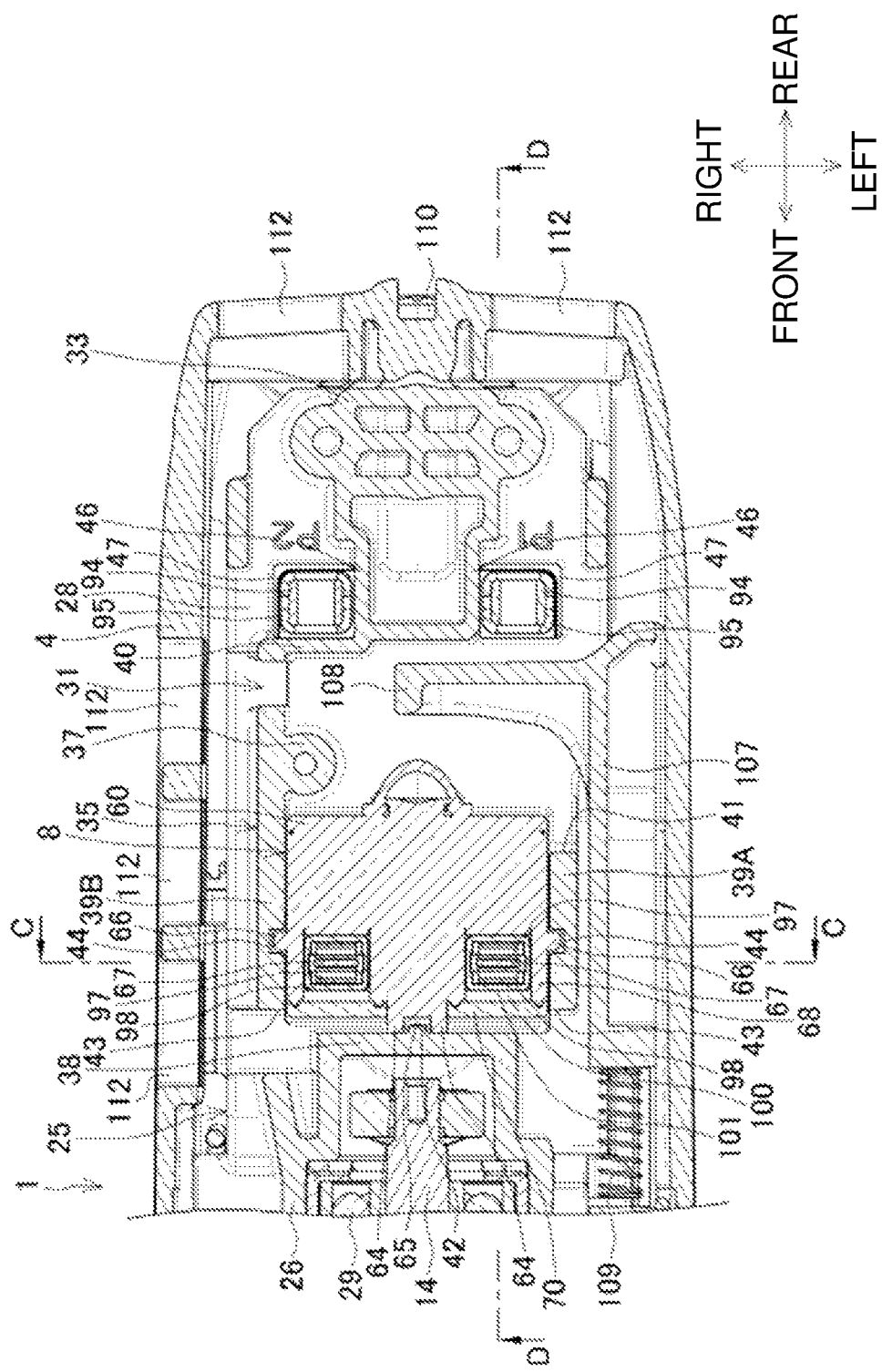
FIG. 10 is a cross-sectional view taken along line A-A in FIG. 3.
Figure 11:
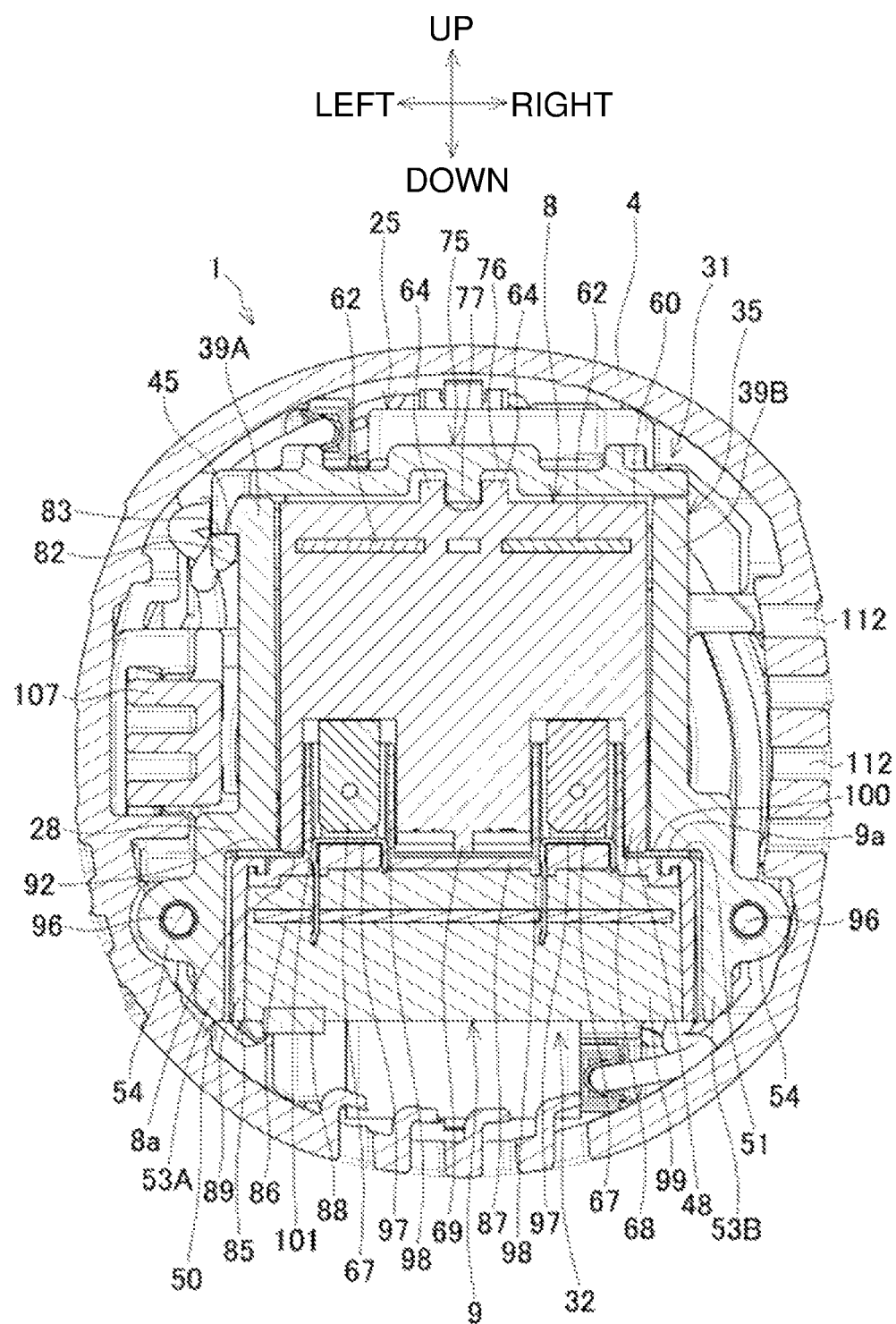
FIG. 11 is a cross-sectional view taken along line C-C in FIG. 10, with the front of a motor housing and other parts being eliminated.

The controller 9 is then placed on the lower attachment seat 51 on the mount plate 28 with the left and right positioning tabs 90 in contact with the rear of the lower screw bosses 54. In this state, screws 102 extending through the through-holes 91 in the positioning tabs 90 from the rear are screwed into the lower screw bosses 54. As shown in FIGS. 3, 6, and 11, the controller 9 is then fastened to the lower attachment seat 51 on the mount plate 28. As shown in FIG. 10, the power input terminals 94 protrude through the holes 47 in the mount plate 28 to the left and right of the partition ribs 46. The controller terminals 97 protrude through the through-hole 48 in the mount plate 28 to above the mount plate 28.

With the button 61 on the rear and the side ribs 66 on the housing 60 fitting into the left and right grooves 44 on the upper retainer wall 35, the switch 8 is pushed in from above between the left and right upper side walls 39A and 39B. The rear lower surface of the housing 60 is then placed on the upper attachment seat 36, and the bottom rib 49 on the upper attachment seat 36 fits into the lower groove 71 on the lower surface of the housing 60. The front rib 42 on the upper front wall 38 fits between the ridges 64 on the front surface of the housing 60.

Figure 12:
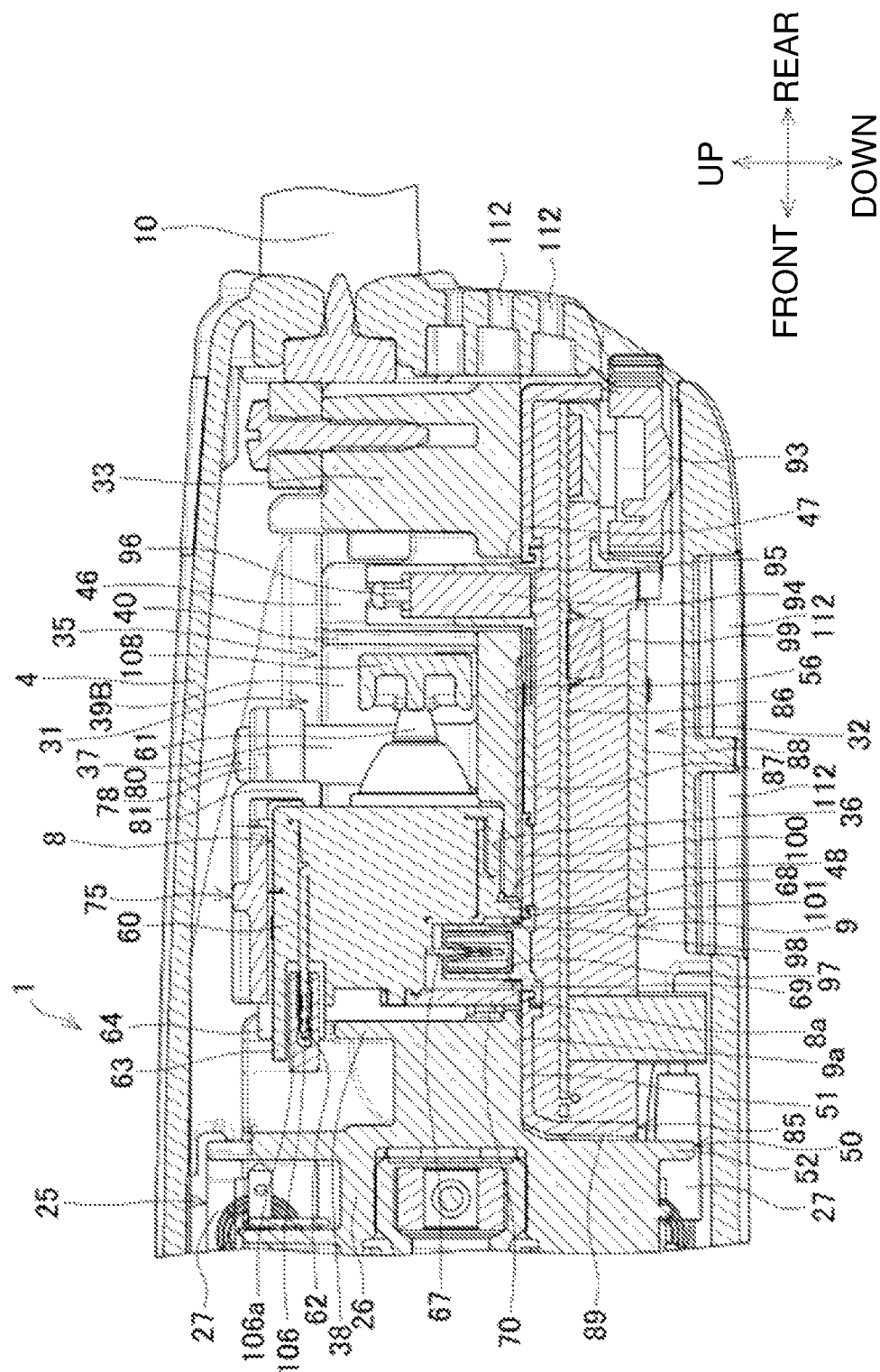
FIG. 12 is a cross-sectional view taken along line D-D in FIG. 10.

As shown in FIGS. 10 to 12, the rectangular cylinder 68 in the housing 60 fits into the through-hole 48 in the mount plate 28. The front rectangular cylinders 98 of the controller terminals 97 protruding through the through-hole 48 are then placed into the rectangular cylinder 68 from below. The switch terminals 67 are placed into and connected to the controller terminals 97.

The assembling order of the switch 8 and the controller 9 may be reversed.

With the ridges 64 fitting in the fitting recess 76 and the fitting rib 77 fitting between the ridges 64, the positioning plate 75 is placed to cover the upper surface of the housing 60. This causes the locking tab 45 on the left upper side wall 39A to be engaged in the engagement hole 83 in the side abutting tab 82. The screw 80 is placed from above into the through-hole 79 in the screw tab 78 and screwed into the upper screw boss 37. This causes the positioning plate 75 to press the housing 60 from above and thus allows the housing 60 to be fastened to the upper attachment seat 36.

In this state, the lower end of the rectangular cylinder 68 presses the elastic sheet 100, elastically deforming the elastic sheet 100. This causes areas around the connections between the switch terminals 67 and the controller terminals 97 to be sealed by close contact between the rectangular cylinder 68 and the elastic sheet 100.

At the same time, at the front surface of the housing 60, the front rib 42 presses the sealing member 65, elastically deforming the sealing member 65. This causes the front surface of the housing 60 and the upper front wall 38 to be sealed between the left and right output terminals 62 by close contact between the front rib 42 and the sealing member 65.

The output terminals 62 are connected to connectors 106 (FIG. 12) of a lead wire 105 directed from the stator 11 in the motor 6. Each connector 106 includes an insulating cover 106a. The insulating cover 106a covers the connection between the connector 106 and the output terminal 62. Each output terminal 62 is partitioned by the front rib 42 and the sealing member 65, and is covered with the protection plate 63 from above. This reduces the likelihood of a short circuit being formed by, for example, iron powder.

A pair of cables of the power cable 10 fixed to the cable receiver 33 is electrically connected to the power input terminals 94 with the screws 96. Each power input terminal 94 is partitioned by the partition ribs 46 and the protective rectangular cylinders 95. This reduces the likelihood of a short circuit being formed by, for example, iron powder.

The switch knob 7 is connected to a slide bar 107. The slide bar 107 extends in the front-rear direction on the left of the upper retainer wall 35 in the motor housing 3. The slide bar 107 includes a pressing portion 108 that bends to the right. The pressing portion 108 protrudes inside the upper retainer wall 35 through the cutout 41 in the upper retainer wall 35 and is located behind the button 61 on the switch 8. As the slide bar 107 moves forward in response to a sliding operation on the switch knob 7 forward, the pressing portion 108 presses the button 61. A coil spring 109 between the slide bar 107 and the inner housing 25 urges the slide bar 107 and the switch knob 7 toward a retracted position at which the pressing portion 108 does not press the button 61.

The rear cover 4 is placed from the rear to cover the inner housing 25 with the switch 8 and the controller 9 assembled together. At the position at which the front end of the rear cover 4 overlaps the rear end of the motor housing 3, a screw 110 extending through the rear surface of the rear cover 4 is screwed into a boss 111 on the rear surface of the mount plate 28. This causes the rear cover 4 to be fastened to the inner housing 25. The rear cover 4 has multiple inlets 112 in its rear, right and left side, and lower surfaces.

When the switch knob 7 is slid forward, the slide bar 107 moves forward and the pressing portion 108 pushes the button 61 on the switch 8, thus causing the switch 8 to be turned on. Thus, the controller 9 drives the motor 6 to rotate the output shaft 14. The spindle 5 rotates via the bevel gears 15 and 19, thus allowing grinding or other operations using the tip tool 24.

When the fan 16 rotates as the output shaft 14 rotates, outside air is sucked through each inlet 112 in the rear cover 4. A part of the air sucked through the inlets 112 flows above the mount plate 28 and passes between the upper retainer wall 35 and the switch 8, and becomes airflow passing through the vent 43 to the motor 6. This cools the switch 8 and the motor 6. The air sucked through the inlet 112 on the lower surface becomes airflow to the motor 6 after passing through the heat sink 88. Thus, the airflow is intensively in contact with the heat sink 88, which facilitates heat dissipation of the controller 9 (in particular, the triac).

When the switch knob 7 is released from being slid forward, the slide bar 107 retracts under an urging force from the coil spring to release the pressure on the button 61 applied by the pressing portion 108. Thus, the switch 8 is turned off to stop the motor 6.

The grinder 1 according to the embodiment includes the motor 6, the controller 9 including the circuit board 86 and the controller terminals 97 electrically connected to the circuit board 86, and the switch 8 including the switch terminals 67 electrically connected to the controller terminals 97 accommodated in the rear cover 4 (housing). The controller terminals 97 are located on the upper surface 9a (first facing surface facing the switch) of the controller 9. The switch terminals 67 are located on the lower surface 8a (a second facing surface facing the controller) of the switch 8. The controller terminals 97 and the switch terminals 67 are in direct contact with each other and are electrically connected to each other. The elastic sheet 100 (seal) is located between the upper surface 9a of the controller 9 and the lower surface 8a of the switch 8 to seal the periphery of controller terminals 97 and the periphery of the switch terminals 67 with the controller terminals 97 being in direct contact with the switch terminals 67.

This structure achieves the sealing between the upper surface 9a of the controller 9 and the lower surface 8a of the switch 8 using the elastic sheet 100 with a simple assembly operation. Thus, the electrical connection between the controller 9 and the switch 8 is sealed tightly to effectively prevent a short circuit.

The elastic sheet 100 is located on the upper surface 9a of the controller 9. The rectangular cylinder 68 (cylinder) formed from a resin is located on the lower surface 8a of the switch 8. The rectangular cylinder 68 is in contact with the elastic sheet 100 and seals the periphery of the controller terminals 97 and the periphery of the switch terminals 67 with the controller terminals 97 being in direct contact with the switch terminals 67.

The rectangular cylinder 68 comes in surface contact with the elastic sheet 100, thus enhancing sealing.

The front rectangular cylinders 98 (second cylinder) formed from a resin are located on the upper surface 9a of the controller 9. The front rectangular cylinders 98 cover the periphery of the controller terminals 97 and protrude toward the rectangular cylinder 68. The front rectangular cylinders 98 are placed in the rectangular cylinder 68 with the controller terminals 97 being in direct contact with the switch terminals 67.

The distance of a labyrinth to the contact between the terminals is increased, thus enhancing sealing.

The rectangular cylinder 68 and the front rectangular cylinders 98 are integral with the controller 9 or the switch 8. This structure stabilizes the positions of the front rectangular cylinders 98 and the rectangular cylinder 68, thus allowing the front rectangular cylinders 98 to be easily placed into the rectangular cylinder 68.

The rectangular cylinder 68 and the front rectangular cylinders 98 cover the full portion of the periphery of the controller terminals 97 or the switch terminals 67.

Thus, the controller terminals 97 and the switch terminals 67 are reliably protected.

The motor housing 3 (housing) includes an inner housing 25 between the switch 8 and the controller 9. The switch holder 31 holding the switch 8 is located on the upper surface of the inner housing 25. The controller holder 32 holding the controller 9 is located on the lower surface of the inner housing 25. The rectangular cylinder 68 is placed in the front rectangular cylinders 98 through the through-hole 48 in the inner housing 25.

This structure enhances the sealing of the electrical connection between the controller 9 and the switch 8, and the through-hole 48 also allows the positioning of the rectangular cylinder 68.

The upper screw boss 37, the positioning plate 75, and the screws 80 (switch positioner) are located to position the switch 8 in the inner housing 25.

Thus, the switch 8 can be stably positioned without rattling.

The lower screw bosses 54, the positioning tabs 90, and the screws 102 (controller positioner) are located to position the controller 9 in the inner housing 25.

Thus, the controller 9 can be stably positioned without rattling.

The switch 8 includes the housing 60 and the output terminals 62 connected to the motor 6. The housing 60 includes the protection plate 63 (terminal protector) covering a part of the output terminals 62 in a contactless manner.

This structure thus prevents a short circuit from being formed between the output terminals 62.

The controller 9 includes a pair of power input terminals 94 to receive power to the circuit board 86. The protective rectangular cylinders 95 (protector) are located at least on the surfaces of the pair of power input terminals 94 facing each other to protect the power input terminals 94.

This structure thus prevents a short circuit from being formed between the power input terminals 94.

The seal is the elastic sheet 100 (sheet elastic member).

The elastic sheet can have a large area with enhanced sealing.

Modifications will now be described.

In the embodiment, an elastic sheet is used as a seal in the controller case, but a strip-shaped seal may surround the periphery of the controller terminals. The seal is not limited to a sponge but may be a rubber member or another member.

In the embodiment, the two switch terminals are covered with a single rectangular cylinder, but a rectangular cylinder may be used for each switch terminal. In this case, each rectangular cylinder may be placed in the corresponding front rectangular cylinder in the controller terminal.

In the embodiment, the cylinder (rectangular cylinder) is located in the housing of the switch and the seal (elastic sheet) is located in the case of the controller. Conversely, the cylinder may be located in the case of the controller and the seal may be located in the housing of the switch.

The shapes of the terminals are not limited to those in the embodiment. The switch terminals may be female, and the controller terminals may be male. The cylinder and the second cylinder are not limited to the rectangular cylinders as in the embodiment, but may be circular cylinders. The cylinder and the second cylinder are not limited to the cylinders covering the full portion of the periphery of the terminal, but may be shorter than the terminal.

The cylinder and the second cylinder may be eliminated. For example, the controller may include no case, the circuit board may be covered with an insulating material, or a plate may be partially attached to the controller. In this case, the controller terminals are located on the surface of the controller facing the switch (first facing surface). Similarly, the switch may include no housing. In this case, the switch terminals are located on the surface of the switch facing the controller (second facing surface). Thus, a seal covering the periphery of both the terminals is to be placed between the two facing surfaces.

In the embodiment, the switch is located upward and the controller is located downward. Conversely, the switch may be located downward, and the controller may be located upward, or the switch and the controller may be located laterally.

The switch may be located with the button facing frontward. An ON/OFF operation on the switch may be performed by the pressing portion of the slide bar independently of the orientation of the button, or may be performed by a link member that swings in coordination with the slide of the slide bar. The switch may be turned on or off by swinging of a lever, rather than by pressing of a button.

The housing may have any shape other than the shape described in the embodiment. For example, the closing plate may be eliminated, and an integral rectangular cylinder may be located in the housing.

The switch positioner is not limited to the positioning plate in the embodiment. The positions and the number of screws may be changed, or the housing may be screwed directly to the inner housing without the positioning plate. The positioning is not limited to the positioning using screws, but may be performed using a locking tab in the inner housing engaged with the housing.

The terminal protector for the output terminal is not limited to the protection plate covering the upper surface alone as in the embodiment. The terminal protector may be semi-cylindrical or cylindrical to cover multiple surfaces of the output terminal. The terminal protector may be eliminated.

Sealing between the output terminals may be performed with ribs on the housing and a sealing member on the inner housing, conversely to the structure in the embodiment. The shape of the ribs and the sealing members may be changed as appropriate. Sealing may not include a sealing member and may be performed through contact between ribs. The seal between the output terminals may be eliminated.

The controller positioner is not limited to the lower screw boss and the positioning tab in the embodiment. A screw boss may be located in the case and a positioning tab in the controller holder. The positioning is not limited to the positioning using screws, but may be performed using a locking tab in the inner housing engaged with the housing, similarly to the screw.

The protector for the power input terminal is not limited to the protective rectangular cylinder in the embodiment. A wall may cover the facing surface of the power input terminal alone, or the protector may be eliminated. The power cable may be electrically connected in a manner other than with screws.

The case and the circuit board may have any shape other than the shape described in the embodiment. The case and the circuit board may extend laterally, rather than in the front-rear direction. The case and the circuit board may be square or in other shapes as viewed in plan. The variable speed dial may have another shape or be at another position, or may be eliminated.

The shape and the position of the heat sink are not limited to the shape and the position described in the embodiment. The heat sink may be eliminated.

The structure of the grinder is not limited to the structure described in the embodiment. A brushless motor may be used as a motor. A brake for the output shaft may be located in the front portion of the motor housing.

The power tool may be a device other than a grinder. The present disclosure is also applicable to other power tools, such as a polisher, an angle screw driver and an angle impact driver.

The power tool may be a direct current (DC) machine powered by a battery.

REFERENCE SIGNS LIST 1 grinder
2 gear housing
3 motor housing
4 rear cover
5 spindle
6 motor
8 switch
8a lower surface
9 controller
9a upper surface
14 output shaft
25 inner housing
26 bearing holder
27 brush holder
28 mount plate
31 switch holder
32 controller holder
35 upper retainer wall
36 upper attachment seat
37 upper screw boss
38 upper front wall
39A, 39B upper side wall
42 front rib
48 through-hole
50 lower retainer wall
51 lower attachment seat
52 lower front wall
53A, 53B lower side wall
54 lower screw boss
60 housing
61 button
62 output terminal
63 protection plate
65 sealing member
67 switch terminal
68 rectangular cylinder
75 positioning plate
85 case
86 circuit board
87 terminal board
88 heat sink
90 positioning tab
94 power input terminal
95 protective rectangular cylinder
97 controller terminal
98 front rectangular cylinder
100 elastic sheet

What is claimed is:

1. A power tool, comprising:
a housing;
a motor accommodated in the housing;
a controller accommodated in the housing, the controller including
   a circuit board, and
   a controller terminal located on a first facing surface and electrically connected to the circuit board;
a switch accommodated in the housing, the switch including a switch terminal located on a second facing surface facing the controller, the switch terminal being in direct contact with the controller terminal and electrically connected to the controller terminal;
a seal between the first facing surface and the second facing surface, the seal sealing a periphery of the controller terminal and a periphery of the switch terminal with the controller terminal being in direct contact with the switch terminal;
a cylinder on the second facing surface, the cylinder comprising a resin, the cylinder covering the periphery of the switch terminal; and
a second cylinder on the first facing surface, the second cylinder comprising a resin, the second cylinder covering the periphery of the controller terminal and protruding toward the cylinder,
wherein the first facing surface is a surface of the controller facing the switch,
the cylinder protrudes toward the second cylinder,
the housing includes
   an inner housing between the switch and the controller, the inner housing having a through-hole,
   a switch holder on a first surface of the inner housing, the switch holder holding the switch, and
   a controller holder on a second surface of the inner housing, the controller holder holding the controller, and one of the cylinder or the second cylinder is placed in another of the cylinder or the second cylinder through the through-hole.

2. The power tool according to claim 1, wherein
the seal is located on the first facing surface, and
the cylinder is in contact with the seal and seals the periphery of the controller terminal and the periphery of the switch terminal with the controller terminal being in direct contact with the switch terminal.

3. The power tool according to claim 2, wherein
the second cylinder is placed in the cylinder with the controller terminal being in direct contact with the switch terminal.

4. The power tool according to claim 3, wherein
the cylinder and the second cylinder are integral with the controller or the switch.

5. The power tool according to claim 4, wherein
the cylinder and the second cylinder cover a full portion of the periphery of the controller terminal or the switch terminal.

6. The power tool according to claim 3, wherein
the cylinder and the second cylinder cover a full portion of the periphery of the controller terminal or the switch terminal.

7. The power tool according to claim 2, wherein
the switch includes
a switch housing, and
an output terminal connected to the motor, and
the switch housing includes a terminal protector covering a part of the output terminal in a contactless manner.

8. The power tool according to claim 1, wherein
the seal is located on the second facing surface, and
the second cylinder is in contact with the seal with the controller terminal being in direct contact with the switch terminal, and the second cylinder seals the periphery of the controller terminal and the periphery of the switch terminal.

9. The power tool according to claim 8, wherein
the cylinder is placed in the second cylinder with the controller terminal being in direct contact with the switch terminal.

10. The power tool according to claim 9, wherein
the cylinder and the second cylinder cover a full portion of the periphery of the controller terminal or the switch terminal.

11. The power tool according to claim 1, wherein
the switch includes
a switch housing, and
an output terminal connected to the motor, and
the switch housing includes a terminal protector covering a part of the output terminal in a contactless manner.

12. The power tool according to claim 1, wherein
the controller includes a pair of power input terminals to receive power to the circuit board, and
a protector is located at least on each of surfaces of the pair of power input terminals facing each other to protect a corresponding power input terminal of the pair of power input terminals.

13. The power tool according to claim 1, wherein
the seal includes an elastic sheet.

14. The power tool according to claim 1, further comprising:
a switch positioner positioning the switch in the inner housing.

15. The power tool according to claim 14, further comprising:
a controller positioner positioning the controller in the inner housing.

16. The power tool according to claim 1, further comprising:
a controller positioner positioning the controller in the inner housing.

* * * * *